Sept. 27, 1938.  E. DANNER  2,131,417
MEANS FOR PRODUCING MULTIBORE GLASS TUBING
Filed July 29, 1936  5 Sheets-Sheet 1

Inventor
Edward Danner
By
Attorney

Sept. 27, 1938.   E. DANNER   2,131,417
MEANS FOR PRODUCING MULTIBORE GLASS TUBING
Filed July 29, 1936   5 Sheets-Sheet 2

Inventor
Edward Danner

Sept. 27, 1938.　　　　E. DANNER　　　　2,131,417
MEANS FOR PRODUCING MULTIBORE GLASS TUBING
Filed July 29, 1936　　　5 Sheets-Sheet 3

Inventor
Edward Danner

Sept. 27, 1938.　　　　　E. DANNER　　　　　2,131,417
MEANS FOR PRODUCING MULTIBORE GLASS TUBING
Filed July 29, 1936　　　　5 Sheets-Sheet 4

Inventor
Edward Danner
By Faust F. Crampton
Attorney

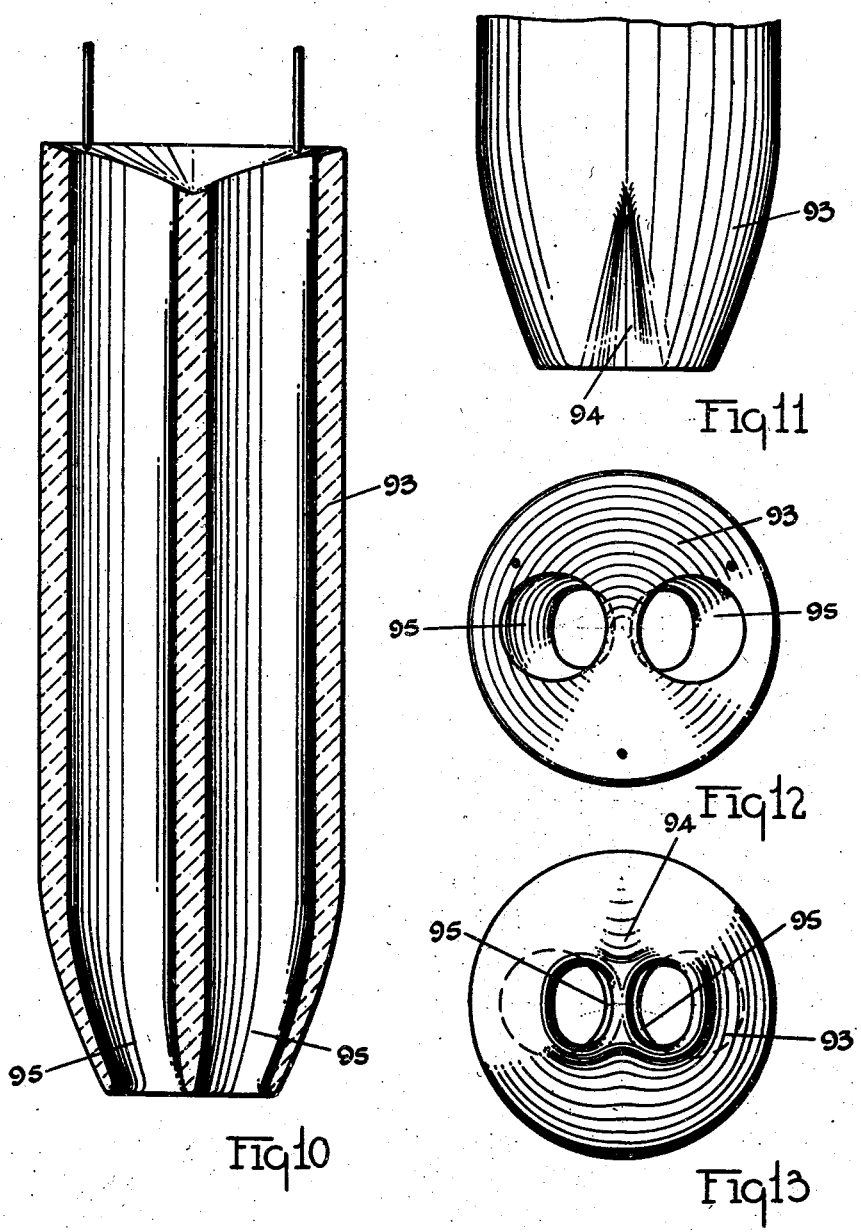

Patented Sept. 27, 1938

2,131,417

UNITED STATES PATENT OFFICE 2,131,417

MEANS FOR PRODUCING MULTIBORE GLASS TUBING

Edward Danner, Newark, Ohio

Application July 29, 1936, Serial No. 93,144

6 Claims. (Cl. 49—17.1)

This invention relates to an apparatus for forming hollow glassware. The apparatus provides an efficient means for directing and distributing molten glass over the surface of a partitioned hollow mandrel that shapes the glass to a form which, when drawn from the mandrel, produces the desired proportional wall dimensions, both as to thickness, surface contour, and cross-sectional area of the passageways in the ware as finally formed.

The invention also provides means and a method whereby multichambered glassware in the form of tubing may be rapidly drawn from a shaping member and wherein glass drawing imperfections and practically all internal stresses and strains are eliminated. More particularly the invention consists in flowing glass over the inner and outer surfaces of a multibore mandrel having parts located in temperature regulated atmospheres to produce desired fluidity or viscosity and consequent controllable distribution of the glass over the mandrel and efficient drawing and shaping of the ware. The invention also consists in providing means for distributing molten glass substantially uniformly over the upper end edge of a multibore mandrel.

The invention consists in other features which will appear from the following description and upon examination of the drawings. Structures containing the invention may be varied in their details without departing from the spirit of the invention. To illustrate a practical application of the invention, I have selected an apparatus for producing chambered hollow glassware as an example of embodiments of the invention. The selected apparatus is described hereinafter. The apparatus is shown in the accompanying drawings.

Figure 1:
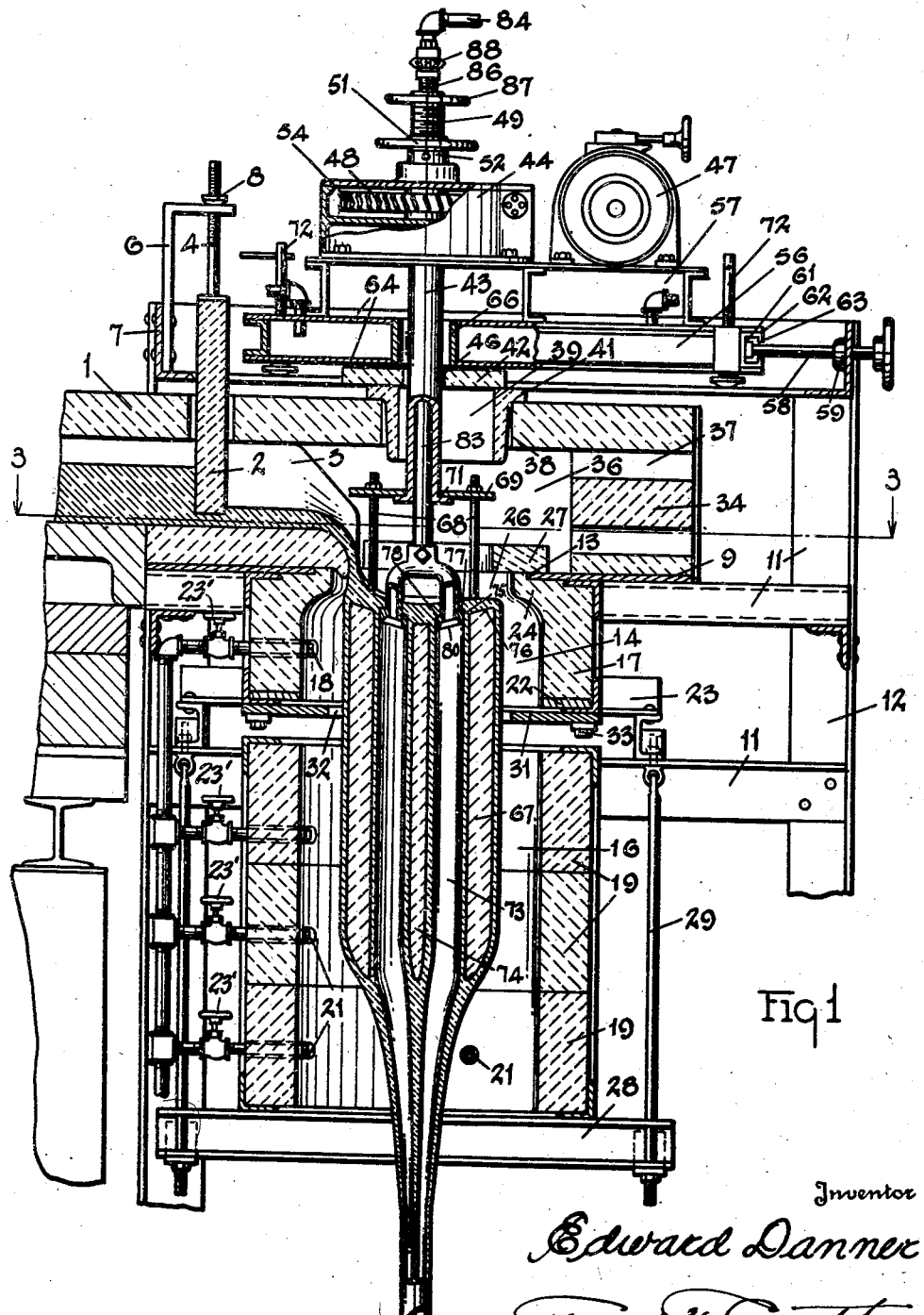
Figure 2:
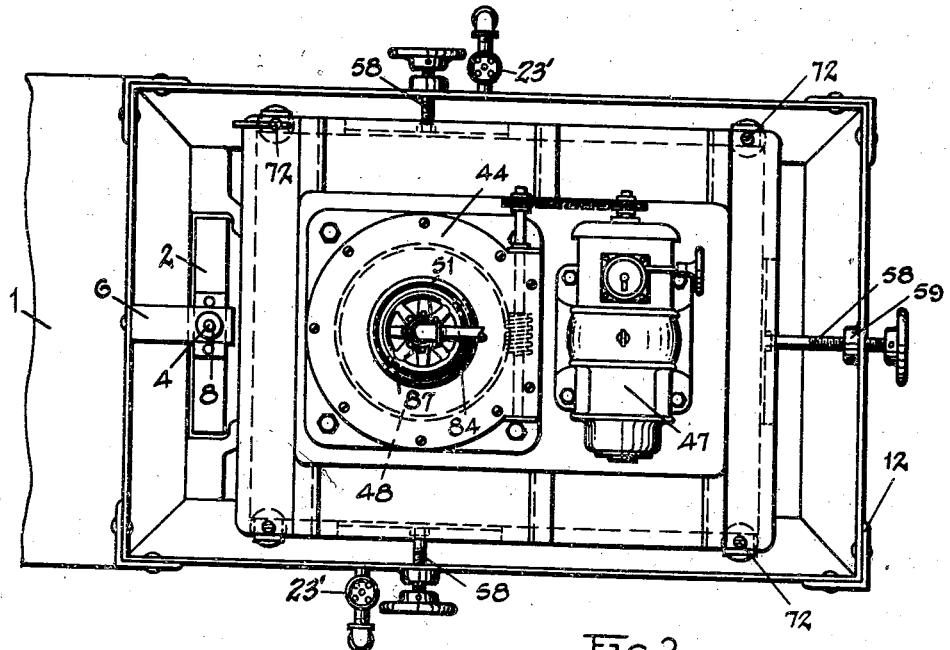
Figure 3:
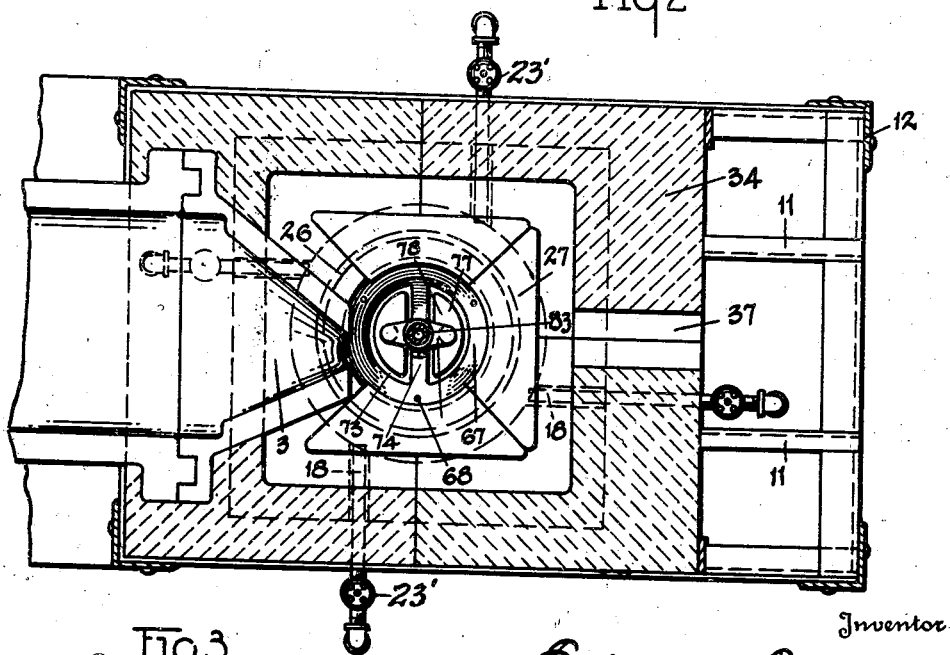
Figure 4:
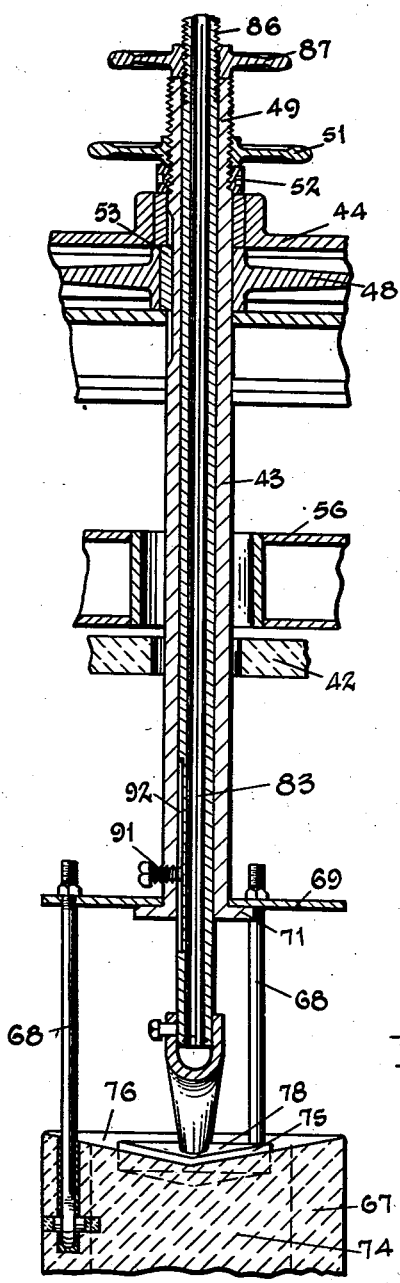
Figure 5:
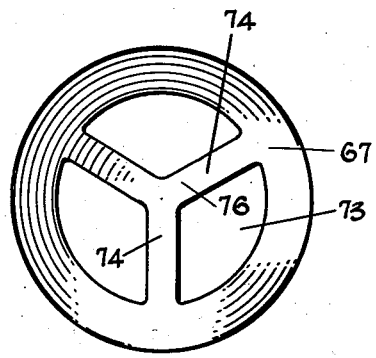
Figure 6:
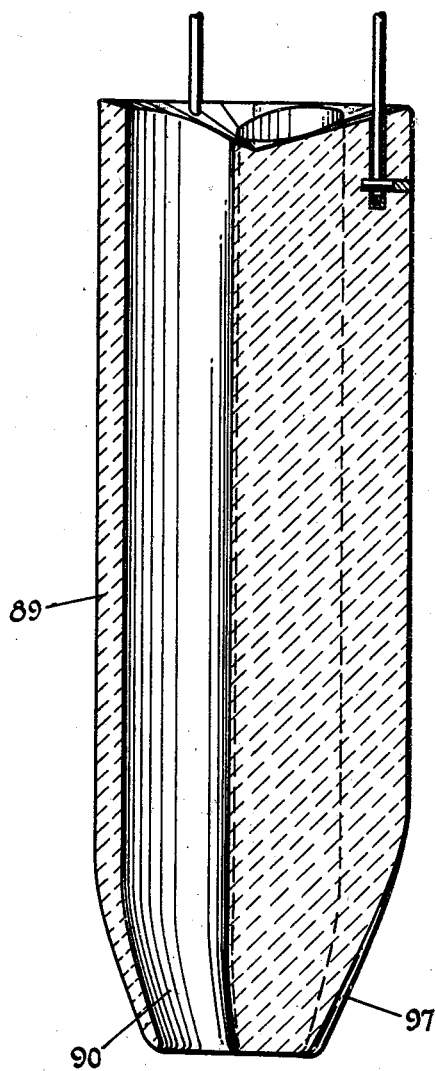
Figure 7:
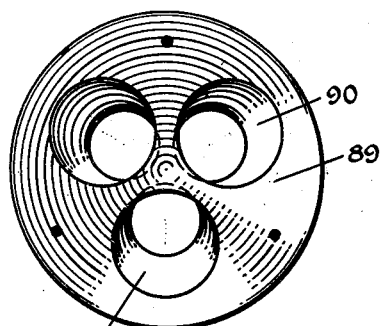
Figure 8:
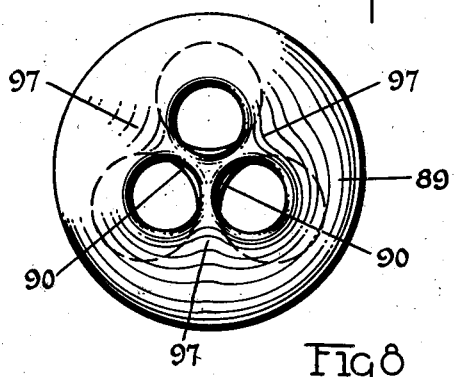
Figure 9:
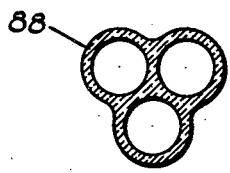

Fig. 1 illustrates a vertical section of the glassware shaping apparatus. Fig. 2 is a top view of the apparatus shown in Fig. 1. Fig. 3 is a view of a section taken on the plane of the line 3—3 indicated in Fig. 1. Fig. 4 is a view of a section of the supporting parts of the mandrel shown in Fig. 1. Figs. 5, 6, and 10 illustrate mandrels of different forms that may be used as may be desired in place of the mandrel shown in Fig. 1. Fig. 5 illustrates a mandrel having three radial walls to form a tri-bore glass tubing. Fig. 6 illustrates a tri-bore mandrel wherein the lower ends of the surfaces of the mandrel converge to produce uniform wall thickness of the tri-bore glassware that may be formed thereby. Fig. 7 illustrates a top view of the mandrel shown in Fig. 6. Fig. 8 illustrates a lower end view of the mandrel shown in Fig. 6. Fig. 9 illustrates a cross-section of the glass tubing formed by the mandrel shown in Figs. 6, 7 and 8. Fig. 10 is a view of a di-bore mandrel having interior cylindrical surfaces. Fig. 11 illustrates the exterior surface of the lower end part of the mandrel shown in Fig. 10. Fig. 12 is a top view, and Fig. 13 is a view of a lower end part of the mandrel shown in Fig. 10. Fig. 14 illustrates a cross-sectional view of the glass that may be drawn from the mandrel shown in Figs. 10, 11, 12 and 13.

In the particular form of apparatus shown in the drawings, the forehearth 1 of a glass supply or melting tank, not shown, is provided with a gate 2 for controlling the flow of glass from a trough 3. The gate 2 is supported by means of a threaded rod 4 connected to the upper end of the gate. The rod extends through a bracket 6 that may be connected to a supporting frame 7. A nut 8 located on the upper end of the rod 4 engages the upper surface of the bracket, and the lower edge of the gate 2 may be adjusted with reference to the bottom of the trough 3 by rotation of the nut. The trough is supported on a plate 9, which in turn is supported on the frame 7 formed of I-beams and L-beams commonly used in such structures and comprising the cross-members 11 and the uprights 12. The plate 9 has a central circular opening 13, and two combustion chambers 14 and 16 are located below in axial alignment with the opening 13 in the plate 9. The combustion chambers are preferably cylindrical in form. The upper combustion chamber 14 comprises a ring 17 of refractory material having one or more burners 18 extending therethrough while the lower chamber 16 may comprise a plurality of compiled rings 19 which are provided with burners 21 that extend through one or more of the rings. The burners preferably extend exradially to produce movement of the burning gases rotatively about the common axis of the chambers 14 and 16. The temperatures of the chambers are varied by the regulation of the gas flow through the valves 23'.

The chamber 14 is supported on an annular plate 22 located on a frame 23 that is supported on the frame 7. The upper edge of the chamber 14 is provided with an inwardly extending ledge 24 over which the trough 3 extends to a point within the area of the opening 26 formed by the edge of the ledge that is located within the area of the opening 13 in the plate 9. The opening 26 may be adjustably closed to a limited area by means of the blocks 27 that are located on the upper end of the chamber 14 and the ledge 24. The blocks 27 may be shifted radially with respect to the axis of the chamber 14 to vary the area of the opening. The chamber 16 is located on a frame 28 that is suspended on rods 29 that depend from parts of the frame 7. A divided nichrome heat-reflecting plate 31 having a central opening 32 is secured to the bottom of the frame 23 by the bolts 33 and operates to separate the chambers 14 and 16. Preferably the bolts 33 extend through slots formed in the plate 31 to enable adjustment of the plate 31 to adjust the opening 32 with reference to the delivery of the glass from the nose of the trough 3. The plate 31 is preferably spaced from the upper end of the chamber 16 to provide a vent for the removal of the products of combustion directly from the chamber 16.

A plurality of refractory blocks 34 form an enclosing chamber 36 that covers the upper end of the chamber 14 and encloses the trough 3. The chamber 36 is provided with suitable flues 37 that serve as vents for the escape of the products of combustion produced by the burning gases in the upper chamber. Independent venting of the chambers 14 and 16 enables independent adjustment of the temperatures of the chambers.

The top wall of the chamber 36 has an opening 38 located above the opening 26 formed in the upper end of the chamber 14. A sleeve 39 is located in the opening 38 and has a flange 41 that engages the upper side of the edge part of the opening 38 to support the sleeve 39. The sleeve 39 is located substantially in axial alignment with the openings 26 and 32 and the chambers 14 and 16. A slidable block 42 is located on the upper edge of the sleeve 39 and its flanges 41 and forms a closure member of the top wall of the chamber 36. A tubular shaft 43 extends vertically upward from within the chamber 36 through the sleeve 39 through an opening 46 formed in the block 42 and into the gear housing 44. The shaft 43 is rotatably supported in the gear housing and a glass-shaping mandrel is connected to its lower end.

A suitable motor 47 operates through a suitable reducing gear 48 to rotate the shaft 43. The tubular shaft may be provided with a threaded upper end portion 49, and the hub of the gear wheel 51 may be tapped and threaded to receive the threaded end 49 of the shaft 43. Thus the wheel may be rotated to raise or lower the shaft and the mandrel. The shaft may be secured in its adjusted position by one or more locking spanner nuts 52. A worm gear 54 that forms a part of the reducing gear 48 may be provided with a suitable key 53 and the shaft may be provided with a suitable keyway in which the key 53 slidably moves to maintain driving connection between the driving gear and the shaft and enable desired vertical adjustments of the shaft with respect to the trough 3 from which the glass flows. The housing 44 and the motor 47 are mounted on a platform 56 by means of a suitable frame 57. The platform 56 is slidably supported on the frame 7 and is adjustably secured in position by means of the threaded rods 58 that extend through the side parts of the upper end of the frame 7. The frame may be provided with blocks 59 welded to the frame 7. The blocks and frame may be bored and tapped to receive threaded ends of the rods 58. The rods 58 are provided with heads 61 located in channel members 62 secured to the sides of the platform 56. The channel members may be provided with inturned flanges 63 that are engaged by the heads 61 whereby the platform 56, together with the housing 44 and the tubular shaft 43 may be laterally adjusted. The platform may be adjusted with reference to the horizontal to maintain vertical alignment of the suspended mandrel with the shaft by means of the jacks 72. The jacks support the platform 56 on flanged parts of the frame 7 and may be operated to adjust the axis of the shaft with reference to the vertical. The platform 56 may be provided with top and bottom plates 64 having openings. A shell 66 is located in the openings and closes the space between the plates 64. Water or cool air may be circulated through the chamber formed by the plates for heat insulating the motor and the driving gear of the shaft 43.

The mandrel 67 is connected to the lower end of the shaft 43. It is suspended in the chambers 14 and 16 and spaced from the wall surfaces to prevent contact of any part of the apparatus with any of the glass intermediate the end edges of the mandrel and located on the outer surface of the mandrel. The shaft 43 extends to near the delivery end of the trough 3 and is connected to a hollow, substantially cylindrical, and interiorly partitioned mandrel 67. The upper end edge of the mandrel is located beneath the glass delivery end of the trough 3 and so as to receive the molten glass from the trough. The mandrel divides the flowing stream into portions that move over its outer surface and the inner surfaces of the chambers of the mandrel to the lower end of the mandrel. The glass is drawn from the lower end of the mandrel to form the ware.

The mandrel 67 is rotated by the shaft 43 to evenly distribute the glass over the upper part of the mandrel. The mandrel is suspended from the lower end of the tubular shaft by means of the rods 68. The lower ends of the rods 68 may be embedded in the refractory material of which the mandrel is formed to securely connect the rods to the mandrel. The upper ends of the rods are connected to a ring 69 that is secured to a flange 71 formed on the lower end of the tubular shaft 43.

The total quantity or rate of discharge of the glass is controlled by adjustment of the gate 2. The relative quantities of the glass that flow onto the inside and the outside surfaces of the mandrel may be varied by the lateral adjustments of the shaft with respect to the center line of the glass stream flow. The edge of the opening 32 of the partitioning plate 31 is disposed in proximity to the surface of the mandrel 67, and when the mandrel is adjustably shifted by the adjustment of the platform 56, the plate 31 is adjusted to prevent contact of the edge of the opening with the glass located on the outer surface of the mandrel 67. Also the closure block 42 is adjustably shifted when the platform is adjusted to prevent frictional contact of the block with the shaft 43.

The interior of the hollow mandrel 67 is divided to form a plurality of chambers by one or more partitioning walls that extend lengthwise the mandrel and at any desired angle to each other. Also, the cross-sectional shape of the outer wall of the mandrel may be of any desired form, and the space dividing walls may be disposed in any manner within the mandrel and have any desired contour to produce chambers having the desired cross-sectional shape. The wall parts of the mandrel shown in the figures form the chambers 73.

The upper end surface 76 of the mandrel is preferably formed concave and so as to slope to the line of intersection of the vertical central planes of the partitioning walls 74 or to the central axis of the mandrel when chambered by radially disposed partitioning wall parts, as in the form of construction shown in Fig. 1. The concave surface of the upper end of the mandrel may be spherical or it may be conical. The concave surface distributes the glass inwardly along the upper end edges of the partitioning walls.

The upper end of the mandrel is provided with a plurality of refractory glass deflecting or intercepting plates 77 of nichrome metal or the like and whose edge parts 75 are located in spaced relation with respect to the lateral interior surfaces of the partitioning wall parts and the inner surface of the exterior wall of the mandrel. Except for the uniform spaced relation of the edge parts of the plates to the parts of the interior surfaces of the mandrel, the deflecting or intercepting plates 77 substantially cover the chambers formed within the mandrel and coact with the glass on the mandrel to completely close the upper end of the mandrel. The glass ordinarily spreads over the entire upper surfaces of the end of the mandrel 67 and the plates 77. The lower sides of the plates are provided with the flanges 75 having outwardly tapered lower end edge surfaces to direct the glass to the interior surface of the mandrel and prevent it from following the lower edges of the plate. The upper surfaces 78 of the plates 77 preferably conform to the concave surface 76 of the upper end of the mandrel. The surfaces 76 center at the line of intersection of the central vertical planes of the partitioning walls of the mandrel. The plates 77 coact with the end edges of the division walls of the mandrel to distribute the glass over the interior surfaces of the wall parts and produce even distribution of the glass over the exterior surface of the mandrel. They are spaced from the surfaces of the upper end parts of the mandrel to control the relative glass quantities that move down over vertically aligned portions or subdivisions of the surfaces of the walls to cause the collection at different parts of the lower edges of the walls desired glass quantities and thereby produce desired surface contour and thickness of the walls of the ware when drawn.

The glass is drawn from the lower end of the mandrel by any of the means well known in the art. The glass on the upper and lower parts of the mandrel 67 is maintained at such temperatures that enable ready distribution of the glass in the chamber 14 and efficient drawing operation in the chamber 16. The temperature of the chamber 14 is maintained materially higher than that of the chamber 16. The temperature of the chamber 16 is such as to cool the glass to progressively increase its viscosity to produce efficient drawing conditions.

The interior of the glass is subjected to pneumatic pressure to maintain substantially the proportional dimensions of the glass in the ware as drawn to that produced by the distribution of the glass over surfaces of the mandrel. The intercepting plates 77 are connected to a bifurcated tubular member or pipe 83 that extends through the hollow shaft 43 to above the housing 44 and communicates with a pipe 84 that is connected to a source of supply of air under pressure. The upper end of the pipe 83 is threaded as at 86, and a wheel 87 having tapped and threaded hub is located on the threaded end 86 of the pipe. The hub of the wheel 87 engages the upper end of the hollow shaft 43. Rotation of the wheel 87 adjusts the location of the pipe 83, and consequently adjusts the plates 77 with respect to the mandrel. The pipe 83 may be connected to the pipe 84 by a suitable union 88 that permits rotation of the pipe 83 relative to the pipe 84. Preferably the hollow shaft 43 is connected to the pipe 83 by the stud 91 that engages in a slot 92 formed in the wall of the pipe 83 which produces rotation of the pipe with the shaft and yet permits a longitudinal adjustment of the pipe relative to the shaft.

Thus, each of the chambers of the mandrel and of the glass as it is formed into ware may be subjected to pneumatic pressure to maintain the walls of the glass as it is drawn from the mandrel in their desired relation to each other.

The plates 77 conform to the interior surfaces of the upper end parts of the mandrel and consequently plates of different shapes are used where the bores of the mandrels differ in form. In connection with the mandrel shown in Fig. 1, two plates 77 are used. The mandrel shown in Fig. 5 has three divisional walls 74 and three plates similar to the plates 77 are used to direct the glass to the surfaces of the mandrel. Similar plates, circular or substantially oval in form are used to spread the glass in the use of the mandrels of the form shown in Figs. 6 and 10. The upper end surfaces of the mandrels shown in Figs. 6 and 10 are concavo-conical in form and the glass distributing plates conform to the concavity of the said surfaces of the mandrels.

The mandrel 89 as shown in Fig. 6 has not only the exterior converging lower end part of the exterior wall of the mandrel shown in Figs. 1 and 5, but also the interior surfaces 90 of the mandrel converge. Also, the lower end part of the mandrel is provided with indentations 97 having curved surfaces to produce approximate conformation of the outer surface of the lower end part of the mandrel with the inner surfaces and produce substantially uniform wall thickness of the glass 88 as it is delivered from the lower end of the mandrel substantially as shown in Fig. 9. Likewise all of the surfaces of the lower end part of the mandrel 93 shown in Fig. 10 converge towards each other to enable a uniform drawing of the glass and produce the di-bore glass shown in Fig. 14. The lower end part of the mandrel 93 is provided with indentations 94 having curved concave surfaces. Also the interior surfaces 95 of the lower ends of the bores converge to produce uniform wall thickness of the glass 96 as it is drawn from the mandrel, such as is shown in Fig. 14.

I claim:

1. In a hollow glassware shaping apparatus, a rotatable member, a hollow mandrel depending from the rotatable member, means for flowing glass on the upper end of the mandrel, a pair of independently heated chambers into which the mandrel extends, means for varying the temperature of the chambers, a source of supply of air under pressure, an intercepting member having parts for distributing glass over an interior suface of the mandrel and in air-sealing contact with the glass, a tubular member for supporting the intercepting member and connecting the interior of the mandrel with the source of supply of air under pressure and connected to the rotatable member, and means for rotating the said member and the mandrel.

2. In an apparatus for producing tubular glass, a cylindrical hollow mandrel having an interior space-subdividing wall and a concave end surface, means for supporting and rotating the mandrel about its vertical axis, means for delivering glass to the end edge formed by the cylindrical exterior surface of the mandrel and the concave end surface, and members located intermediate lateral surfaces of end parts of the walls of the mandrel at the end of the mandrel to which the glass is delivered and having upper concave surfaces inclined inwardly toward the axis of the mandrel and spaced from inner lateral surfaces of the end parts of the mandrel.

3. In an apparatus for producing tubular glass, a hollow mandrel, rods embedded in the wall of the mandrel, a plate connected to the rods for suspending the mandrel, a hollow shaft connected to the plate, a pipe extending through the shaft, a member connected to the pipe and located in the end of the mandrel and having edge parts spaced from the interior surface of the mandrel, means for delivering air to the pipe and into the mandrel, means for delivering molten glass onto the upper end of the mandrel and the member, means for laterally and axially adjusting the mandrel with reference to the glass delivering means for regulating the flow of the glass over the interior and exterior surfaces of the mandrel, and means for rotating the shaft, the mandrel and the pipe.

4. A hollow mandrel for forming multi-bore glass tubing, the mandrel having a partitioning wall and an exterior cylindrical surface terminating in a lower conical end part, all of the surface portions of the interior and exterior surfaces of the said lower end part of the mandrel curvedly converging toward the longitudinal axis of the mandrel and the center of the smaller end of the cone.

5. In a glass working apparatus, a trough for directing a stream of molten glass from a forehearth, a chamber enclosing the delivery end of the said trough, upper and lower combustion chambers located below the said first-named chamber, a mandrel, means located above said first-named chamber and having suspended therefrom a member carrying the mandrel in said combustion chambers to intercept the stream, means for rotating the member to distribute the glass over the entire surface of the mandrel in the form of a thin coating, said combustion chambers having surrounding walls spaced from the mandrel sufficient distance to provide a passageway substantially completely surrounding the said parts of the mandrel while rotated and glass covered for venting of gases from the upper combustion chamber that move upwardly into said first-named chamber, and a plate separating the two combustion chambers so that combustion gases produced in said lower combustion chamber will for the most part be excluded from said upper combustion chamber.

6. In an apparatus for producing tubular glass, a plurality of heating chambers located one above the other, a mandrel having end parts located in the chambers and remotely spaced from the walls of the chambers, means for flowing glass onto the upper end of the mandrel in stream form, means for rotating the mandrel to distribute the glass over the surface of the mandrel, means for heating the upper chamber to produce a controlled predetermined temperature of the gases in contact with the glass-coated upper part of the mandrel to produce uniform distribution of the glass on the said upper part of the mandrel, and means for heating the lower chamber to produce a controlled predetermined lower temperature of the gases in contact with the glass-coated lower end part of the mandrel from which the glass is drawn.

EDWARD DANNER.